United States Patent [19]

Manly

[11] 4,087,842
[45] May 2, 1978

[54] RECORDING TRACK ECCENTRICITY COMPENSATION METHOD AND MEANS

[75] Inventor: William A. Manly, Arlington, Tex.

[73] Assignee: Graham Magnetics Inc., Graham, Tex.

[21] Appl. No.: 739,058

[22] Filed: Nov. 5, 1976

[51] Int. Cl.² .................. G11B 21/10; G11B 21/24
[52] U.S. Cl. ................................ 360/77; 360/109
[58] Field of Search ............................ 360/77, 109

[56] References Cited

U.S. PATENT DOCUMENTS

| | | |
|---|---|---|
| 3,246,307 | 4/1966 | Stanley .................................. 360/77 |
| 3,840,893 | 10/1974 | Jacoby et al. ......................... 360/77 |
| 3,854,015 | 12/1974 | Janssen .................................. 360/77 |
| 3,864,740 | 2/1975 | Sordello et al. ....................... 360/77 |

*Primary Examiner*—Robert S. Tupper
*Attorney, Agent, or Firm*—Robert A. Cesari; John F. McKenna

[57] ABSTRACT

Playback method and apparatus compensate exactly for both tracking and speed errors due to any eccentricity in the information track on a rotating recording member during playback by moving the read head in a circular path having the same radius, angular velocity and phase as the circle of eccentricity of the track.

20 Claims, 9 Drawing Figures

FIG. 1

FIG. 4a — TRANSDUCER OUTPUT ENVELOPE

FIG. 4b

FAST
TRACK SPEED
SLOW

FIG. 4c

OUTBOARD TRANSDUCER $L_2$ OUTPUT ENVELOPE

FIG. 4d

INBOARD TRANSDUCER $L_1$ OUTPUT ENVELOPE

TIME ⟶

RECORDING TRACK ECCENTRICITY COMPENSATION METHOD AND MEANS

BACKGROUND OF THE INVENTION

This invention relates to method and means for compensating for track eccentricity in a rotating recording member during playback. It relates more particularly to a technique for compensating for both tracking and speed errors due to such eccentricity so that more information can be packed on the recording member.

In many recording systems, the recording and information storage are done in a disk-type format. For example, stiff and floppy disks are used for digital storage, both magnetic and optical disks are used to store video information and acoustical information is stored mechanically on a phonograph disk. In many cases, it is necessary to position a playback transducer or read head at a desired data track on the recording member with great precision. This is because the information tracks on such recording members are often in the form of concentric circles or spiral convolutions that may be only on the order of five milli-inches wide and spaced an even lesser distance apart on the member. Also in some instances, the recording track contains precisely spaced apart timing or index signals used for control purposes. Obviously, then, the minimum track and index signal spacings are directly dependent upon the accuracy with which the transducer can be positioned relative to the recording member.

When information is being retrieved from disk-type recording members there may be a lack of concentricity between the rotating disk and the circular or spiral recording tracks previously recorded on that disk. In other words, the center of the tracks may be offset from the center of rotation of the disk during playback. The problem arises because the information may be recorded concentrically on the disk on a given machine. Then for one reason or another, the disk may be removed from that machine prior to playback. When it is time to retrieve information from that disk, it is sometimes quite difficult to return the disk to its true or original center of rotation when it is placed in the same or a different machine. Consequently the center of the information tracks during playback no longer corresponds to the center of rotation of the disk. As a result, the recording tracks "wander" radially relative to the playback transducer which is normally maintained at a fixed distance from the center of rotation of the disk. Accordingly the output signal from the transducer corresponding to the information on the selected track is amplitude modulated at twice the frequency of angular rotation of the disk and in extreme cases, an adjacent track may move opposite the transducer, in which case the output from the transducer would be completely erroneous.

In addition to the radial tracking error just described, track eccentricity during playback gives rise to a track speed or time error. In other words, as the track wanders radially inward and outward with respect to the transducer as the disk rotates at a constant angular velocity, the speed of the track past the transducer decreases and increases correspondingly, i.e. the track goes too slow half the time and too fast half the time. Accordingly, information read from the track, e.g. control or index points, varies time-wise relative to a fixed time reference such as timing signals synchronized to the rotation of the disk. Accordingly the index information retrived from the disk would be unsuitable for controlling downstream equipment. Also, if the data on the disk is frequency modulated, during playback from an eccentric track the retrieved signals are frequency modulated at a frequency equal to that of the rotation of the disk giving rise to other filtering or control problems.

Finally the lack of concentricity between the centers of the recording track and the rotation of the recording member during playback causes the azimuth angle between the head and recording member to vary over each revolution of the disk member. This may result in degradation of the output signal from the playback transducer and excessive parts wear.

Several types of electrical systems have been proposed to compensate for tracking error during playback of a rotating recording member such as a disk. Examples of such are shown in the following U.S. Pat. Nos.: 3,246,307; 3,840,893; 3,854,015 and 3,864,740. One type of system utilizes a playback transducer having two or more sensing coils aligned perpendicular to the recording track on a disk. The outputs of the coils are then compared to develop a tracking error signal. The magnitude and polarity of this signal varies as the track wanders radially inward or outward from its centered position opposite the transducer. The error signal is then used to control a positioning device which moves the playback transducer radially inward or outward as needed to maintain the track in its centered position opposite the transducer.

Other such systems employ a pair of transducers arranged perpendicularly to a disk recording track carrying a prerecorded frequency. Each transducer produces a signal at the track frequency whose level is proportional to the portion of the transducer opposite that track. The two signal levels are then compared to produce a difference signal that controls an actuator to move the transducers radially inward or outward to maintain them centered over the track.

Still other systems use optical detecting means and the same sort of servo loop to compensate for track eccentricity.

None of these conventional systems provides an exact compensation for track eccentricity. In the first place, being servo-following devices, they do not anticipate or measure the amount of the eccentricity in advance to set up an exact compensation for the tracking error. Furthermore, they do not compensate at all for the track speed or timing variation due to track eccentricity. Consequently the information retrieved from the disk may still vary in time and frequency so as to produce errors in or malfunction of equipment controlled by the information on the disk.

Still further, these prior systems do not provide any correction at all for the azimuth variation between the transducer and disk due to track eccentricity.

SUMMARY OF THE INVENTION

Accordingly the present invention aims to provide an improved technique for compensating for any eccentricity in the recording track on a rotatable recording member during playback.

Another object is to provide a playback method that compensates for both the tracking error and the speed or timing error produced by an eccentric recording track on a rotatable recording member.

Yet another object of the invention to provide a method for determining the amount of eccentricity in a recording track on a recording member prior to retrieving data from that track.

A further object of the invention is to provide a method for improving the quality of playback signals corresponding to information recorded on an eccentric track on a rotatable recording member.

A further object of the invention is to provide a system for determining and compensating for both tracking and speed or timing errors due to eccentricity in the recording track on a recording member during playback.

Other objects will, in part, be obvious and will, in part, appear hereinafter.

The invention accordingly comprises the several steps and the relation of one or more of such steps with respect to each of the others, and the apparatus embodying the features of construction, combination of elements and arrangement of parts which are adapted to affect such steps, all as exemplified in the following detailed description, and the scope of the invention will be indicated in the claims.

Briefly, I have discovered that compensation along the radius of a recorded track on a disk or like rotatable recording member to correct for tracking error and along the arc of the recorded track to correct for the track speed or timing error are exactly equal to compensation along the radius of rotation of the disk and along the tangent to the disk rotation track. Consequently compensation for track eccentricity during playback can be accomplished exactly by moving the playback transducer in a circular path having the same radius as that executed by the track center (defined as the circle of eccentricity) and at the same angular velocity and phase as the track center.

In accordance with the present method, as soon as it is recognized that the recording track is eccentric, the magnitude of the eccentricity is assessed. Then using this information, exact compensation for both tracking and speed or timing errors due to the eccentricity is effected by imparting the proper circular motion to the playback transducer. Compensation for the tracking and speed errors automatically maintains the playback transducer at the correct azimuth angle relative to the disk.

In a typical application of the present method, the compensation system is incorporated into a more or less standard playback machine. The machine is conventional except that its playback transducer has a flexible mount and provision is made for oscillating the transducer on its mount both radially and tangentially of a disk rotatively mounted in the playback machine so that the transducer can be moved in a small circle opposite the disk.

The playback machine incorporating my system is preferably operated in a set up mode in order to determine the magnitude of any eccentricity in the disk recording track and its phase relative to the rotation of the disk. Using this information, the system then determines the proper amplitude and phase at which to oscillate the playback transducer radially and tangentially of the disk so that it moves in a circle having the same radius, angular velocity and phase as the circle of eccentricity of the track center. Then during the normal operation of the playback machine, the transducer is oscillated in accordance with the information developed by the system so that it executes the compensating circular motion opposite a selected track on the disk. The information retrieved from the disk, as reflected in the signal from the playback transducer, is now completely free of amplitude, frequency and time variations due to eccentricity in the recording track on the disk.

Various specific arrangements for effecting such eccentricity compensation will be described presently in detail.

Thus the present system anticipates and measures the magnitude of any track eccentricity on a recording member and its phase with respect to that of the recording member rotation and uses this information to develop the requisite signals to rotate the playback transducer to exactly compensate for the eccentricity. Not only is there compensation for the radial tracking error as is done conventionally, but also there is an exact compensation for the speed or timing error that stems from the eccentricity. Consequently data such as control or index bits can be packed more closely together around the arc of the track and still be read out reliably. Further, unwanted modulation of frequencies recorded on the disk is minimized. Finally the system maintains the transducer at a constant azimuth minimizing degradation of the output signal from the transducer and parts wear.

BRIEF DESCRIPTION OF THE DRAWINGS

For a fuller understanding of the nature and objects of the invention herein described, reference should be had to the following detailed description taken in connection with the accompanying drawings which.

DESCRIPTION OF THE PREFERRED EMBODIMENTS

Figure 2:
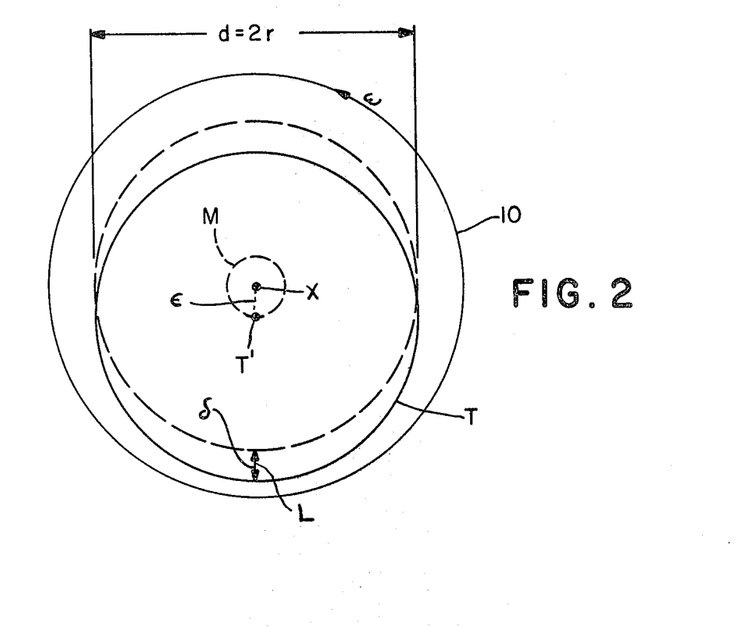
FIGS. 2 and 3 are diagrams illustrating the compensation method employed in the FIG. 1 system.
Figure 3:
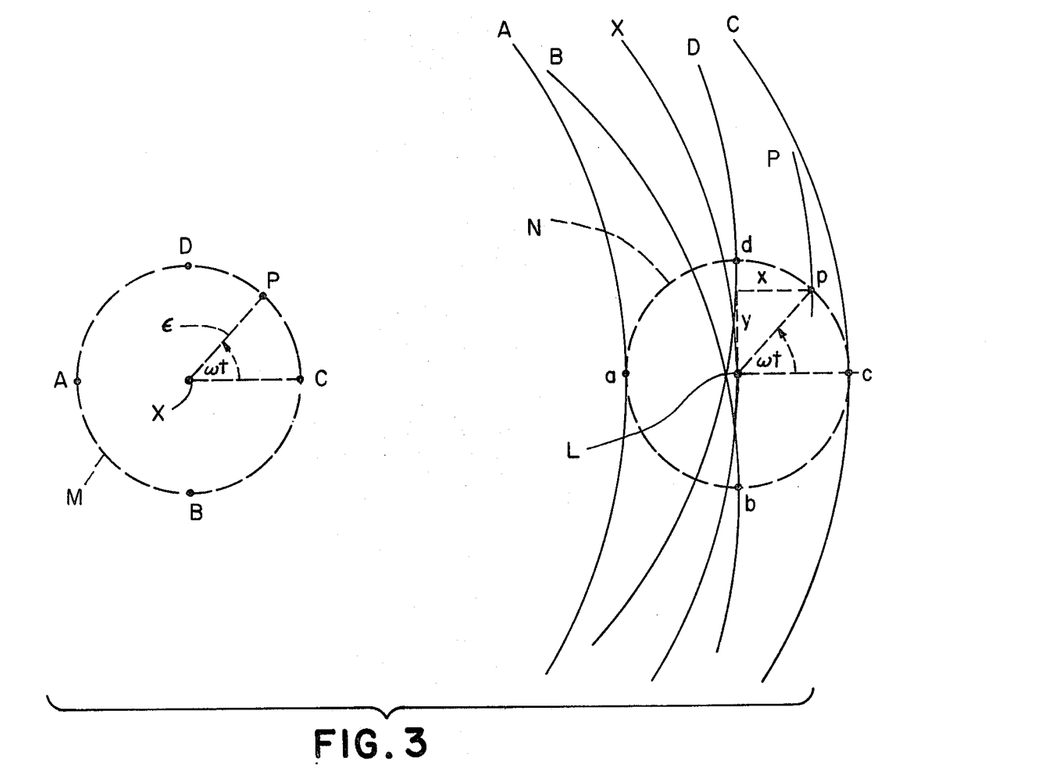

Referring first to FIGS. 2 and 3 of the drawings, whenever data or information is recorded on a disk or similar recording member from one machine and retrieved from the disk on a different machine there is a possibility that the center of rotation of the disk during playback will not correspond to the center of the track already recorded on that disk. Thus FIG. 2 illustrates a disk 10 having information already recorded on it along a circular track T whose center is at T'. Information is now being retrieved from member 10 in a playback machine by rotating the member counter-clockwise about a center of rotation X. As seen from FIG. 2, the center of rotation is spaced from the track center T' by a distance E which represents the track eccentricity during playback. Thus during playback, the track T moves radially relative to a transducer L mounted a fixed distance from the center of rotation X. This movement may be expressed as follows:

$$\delta = \epsilon \cos \omega t \tag{1}$$

where:

$\delta$ = distance between transducer L and track T
$\epsilon$ = eccentricity
$\omega$ = disk angular velocity t = time Thus from Equation 1, it is seen that the distance between the track T and transducer L and therefore the signal level from the transducer are modulated at twice the frequency of disk rotation.

The proper speed of the track past the transducer may be expressed as follows:

$$S = r\omega \tag{2}$$

where:
S = proper track speed
r = track radius
ω = disk angular velocity

On the other hand, the incremental speed variation due to the tracking error δ is as follows:

$$s = \delta\omega \tag{3}$$

where:
s = tracking error speed variation
δ = distance between transducer L and track T
ω = disk angular velocity Therefore combining Equations 1, 2 and 3, it is apparent that the total track speed S' may be expressed as $$S' = S+s = r\omega + \epsilon\omega \cos \omega t \tag{4}$$

Thus the speed S' of the track past transducer L also varies in a periodic fashion. The track moves too fast half the time when it is disposed radially outward from the transducer and too slow half the time when it is radially inward of the transducer. This produces frequency variations in the output signal from the playback transducer. Also any index points on the track will vary timewise with respect to fixed reference signals.

Since the coefficient of the cosine function in the Equation 1 is ε, it is apparent that any correction for the radial tracking error is along the track radius r. On the other hand, since the coefficient of the cosine function in Equation 4 to εω, it is clear that correction for the speed variation due to the tracking error is along the arc of the track.

FIG. 3 shows that compensation along the radius of the recorded track T and along the arc of the track is exactly equal to correction along the radius of rotation of the disk and along the tangent to the actual rotation track of the disk (i.e. a direction perpendicular to the rotation radius). In that figure, X is the actual center of rotation of the recording member 10 during playback. That center of rotation is offset from the center of the previously recorded track T by the distance ε which therefore represents the track eccentricity as in FIG. 2. Points A, B, C and D are the instantaneous positions of the track center T' (FIG. 2) at the quarter points of a playback revolution, the center moving at a speed ωt. These points are all located on a circle of eccentricity M which represents the path of the track center T' during playback.

Arcs A, B, C and D represent tracks of equal radius originating at the track center positions A, B, C and D and arc X represents the correct track originating at the center of rotation X if there were no eccentricity, i.e. the rotation track.

It is apparent from FIG. 3 that by deflecting the transducer L along the radius of rotation of the disk (herein the x direction) and also along the tangent to the rotation track (herein the y direction), the transducer can be positioned opposite points on all of the tracks A, B, C and D. These interception points are indicated at a, b, c and d, in FIG. 3. It is further seen from that figure that all of these points a, b, c and d lie on a circle N whose radius is equal to radius e of the circle of eccentricity M. Thus compensation for both tracking and speed or time errors can be made by moving the transducer L in a circular path N having the same radius as circle M and in phase with the instantaneous position of the track center T'.

Thus for any instantaneous position P of the track center T' during playback that produces a track P, there exists a point p on that track that is swept by the transducer L if the transducer is rotated in the correct circular path as just described. Consequently the tracking and speed compensation is exact, not an approximation. This means that the requisite movement of the transducer to accomplish the compensation can actually be determined and the proper controls set prior to playback so that during a read operation the transducer automatically follows the correct path N. No further measurements or corrections must be calculated during playback by a servo-following system or the like as is required in prior comparable compensation arrangements that do not even provide an exact compensation.

Figure 1:
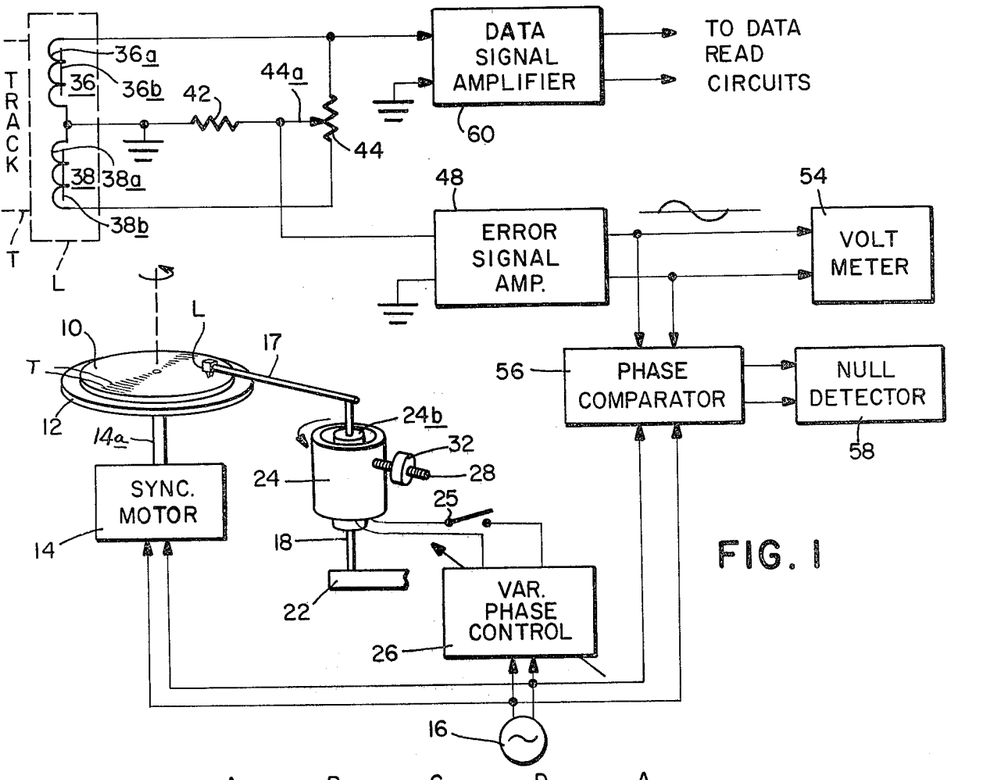
FIG. 1 is a block diagram of a system for compensating for track eccentricity in a recording member during playback.

FIG. 1 shows a simple system for practicing the above-described compensation technique. The recording member 10 is, for example, a stiff or floppy disk having previously recorded information tracks T. These tracks may be concentric circles or different convolutions of a single spiral. If the latter, it is desirable to provide a circular outside track T for setting up the compensation correction.

The disk 10 is placed on a turntable 12 of a more or less conventional playback machine. The turntable 12 is rotated counter-clockwise, in the present instance, by a synchronous motor 14 connected to a standard 60 Hz line voltage source 16. Typically floppy disks are rotated at 360 rpm while magnetic disks used for video purposes turn at 3600 rpm. For one reason or another, the center of rotation of disk 12 is offset from the center of the tracks T so that the tracks are now eccentric relative to the center of rotation of disk 10.

The present system includes a playback transducer L which is connected by way of a stiff horizontal arm 17 to an upstanding flexible rod 18, the lower end of which is supported by a base member 22. This particular support for the transducer L is merely for purposes of illustrating the invention.

Base member 22 is movable to position transducer L coarsely over any selected one of tracks T by an actuator or other suitable means as is done conventionally in such playback machines. The coarse positioning of the transducer may be accomplished as described in the aforesaid patents.

Mounted on the flexible rod 18 is a small a.c. motor 24. Motor 24 has a rotating field coil 24a and its armature 24b is fixed to rod 18. Motor 24 is electrically connected by way of switch 25 to a variable phase control 26. Control 26 also receives the source 16 voltage so that motor coil 24a rotates counter-clockwise. Also the motor has a small threaded stub shaft 28 projecting radially from its side and a small internally threaded weighted sleeve 32 is turned down onto shaft 28. Sleeve 32 can be adjustably positioned along shaft 28 so that when motor 24 is energized, its field coil 24a rotates eccentrically with the magnitude of the eccentricity being determined by the position of the weight 32 on shaft 28.

FIG. 1 also shows the reproducing portion of transducer L which includes a pair of separate magnetic elements 36 and 38. Each of the separate elements includes an electro-magnetic coil 36a and 38a respectively. Pole and air gap portions 36b, 38b represent the effective width of the associated air gaps of these magnetic elements so that each of these elements is operable to magnetically cooperate with areas on an underlying track T corresponding to the illustrated track width in FIG. 1.

Coils 36a and 38a are connected in a simple bridge circuit that includes a resister 42 connected between the common center connection of coils 36a and 38a and the adjustable tap 44a of a potentiometer 44 having its outer terminals connected to the outer terminals of coils 36a, 38a. The circuit produces a series opposition connection of the outputs of coils 36a and 38a to provide an electrical error signal having an amplitude which is proportional to the difference between the amplitudes of the signals from the two coils and having a polarity that corresponds to the polarity of the signal from the transducer 36 or 38 with the higher signal amplitude. This error signal, appearing between the common connection of coil 36a and 38a and adjustable tap 44a, is applied to an error signal amplifier 48.

The output of the error signal amplifier 48 is applied to a volt meter 54 and also to a phase comparator 56 which also receives the line voltage frequency from source 16. The phase difference between the two signals applied to comparator 56 is indicated on a null detector 58.

A data signal amplifier 60 is also included for amplifying the signal generated by the transducer L during a data read operation after the completion of the compensation correction to be described. The output of amplifier 60 is applied to the usual data read circuits found in playback machines of this general type.

In an alternative construction, a tachometer generator or shaft encoder fixed to rotate with the turntable 12 or motor shaft 14a can provide the reference signal to comparator 56, the source 16 frequency then being used to drive motors 14 and 24.

During playback, the output signal from each transducer element 36, 38 is amplitude-modulated as more or less of each transducer element, 36, 38 is disposed opposite track T as the track wanders radially relative to the transducer L. When transducer L is centered directly over track T as illustrated in FIG. 1, the outputs from the transducer elements are equal and there is no output signal applied to amplifier 48.

Figure 4A:
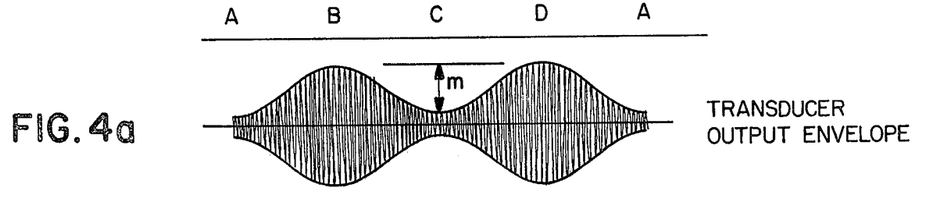
FIGS. 4a to 4d are graphs further illustrating the invention.
Figure 4B:
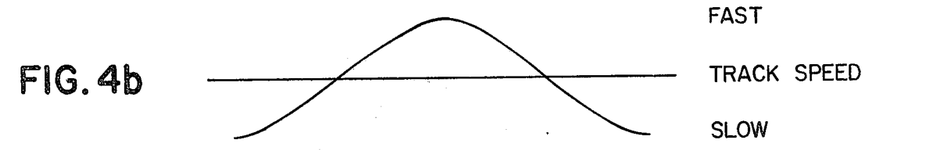
Figure 4C:
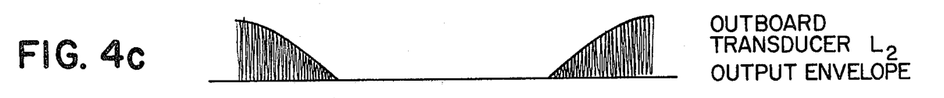
Figure 4D:
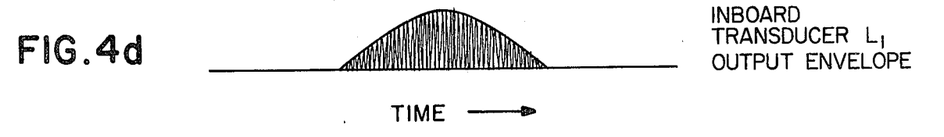

FIG. 4a illustrates the modulation envelope of the output signal from transducer element 36. The corresponding envelope from element 38 is identical except that it is shifted 180° in phase relative to the waveform in FIG. 4a. (The points A to D in FIGS. 4a to 4d correspond to the instantaneous positions A to D of the track center T' in FIG. 3). Accordingly, the output from the error signal amplifier 48 is also a periodic signal, namely a sine wave, whose amplitude as measured on meter 54 is equal to the depth m of the modulation envelope due to the eccentricity shown in FIG. 4a. Thus meter 54 indicates the magnitude of the radial tracking error due to the eccentricity.

Further, the output of comparator 56 as indicated on detector 58 shows the phase difference between the error signal from amplifier 48 and rotation of disk 10 since that is synchronized to the source 16 frequency. For a zero tracking and speed error condition, the amplitude of the error signal from amplifier 48 is essentially zero and it is exactly in phase with the source 16 signal. Consequently under that condition, the meter 54 indicates zero volts and detector 58 indicates a null. On the other hand, when track T is offset from transducer L, the magnitude of the offset is indicated on meter 54, while the direction and rate of change of the offset are indicated by the magnitude and direction of the excursion of the pointer in detector 58.

To compensate for track eccentricity prior to playback the FIG. 1 machine is operated in a setup or initialization mode during which the usual read circuits are rendered inoperative. The transducer L is positioned over a selected, preferably outer, circular track T (or a circular setup track if data is spirally recorded on disk 10). Once motor 14 is energized, the magnitude of any track eccentricity and its phase relative to the rotation of member 10 are indicated on meter 54 and detector 58 respectively. If the track is eccentric, then switch 25 is closed causing motor 24 to rotate and move the transducer L in a circular path opposite the selected track T. If the circular path of the transducer is exactly equal to the circle of eccentricity M (FIG. 3) in radius, angular velocity and phase, then meter 54 indicates zero volts and detector 58 indicates a null. On the other hand, if the transducer path is not equal to the circle of eccentricity, one or both of meter 54 and detector 58 indicate that fact by an appropriate reading. In that event, phase control 26 is adjusted until detector 58 indicates a null condition. Then motor 24 is stopped by opening switch 25 and sleeve 32 adjusted as needed to produce a zero volt reading on meter 54 when the motor 24 is restarted by closing switch 25.

At this point, the transducer L is following the correct path to exactly compensate for the eccentricity of track T. Consequently the compensation measuring system can be disconnected from the playback machine at the input to amplifier 48 and the read circuits reconnected to retrieve the information from disk 10 in the usual way. The settings of phase control 26 and sleeve 32 remain the same until a different disk 10 is placed on turntable 12.

Figure 5:
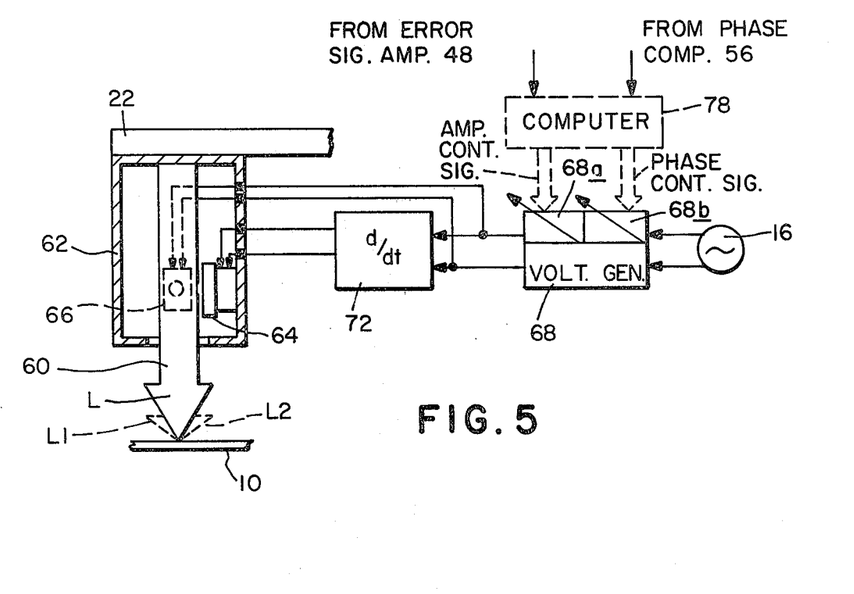
FIG. 5 is a block diagram showing another embodiment of the invention.

FIG. 5 illustrates another technique for moving the playback transducer L in the proper circular path to compensate for track eccentricity. Here the transducer L is mounted at one end of a depending flexible rod 60 which extends into an open-ended housing 62, the opposite end of rod 60 being connected to the top wall of the housing. Housing 62 is connected to base member 22 which can be coarse positioned to place the transducer L opposite a selected track on disk 10.

Rod 60 has a square cross-section and positioned opposite adjacent sides of the rod are a pair of vibrators 64 and 66 which are suitably anchored to the side walls of housing 62. Vibrators 64 and 66 are driven by alternating electrical signals from a voltage generator 68. The two vibrators are operated in quadrature so that the signal applied to one of the vibrators, say vibrator 64, is applied by way of a differentiator 72.

Voltage generator 68 receives the signal from source 16 and it has separately controllable phase and amplitude controls 68a and 68b so that the amplitude and phase of its output signal can be varied independently. With this arrangement the transducer L can be moved in a circular path whose radius and phase angle relative to the rotation of disk 10 can be set by a proper adjustment of controls 68a and 68b to exactly equal those of the circle of eccentricity M (FIG. 3).

In the FIG. 5 arrangement, the excursion of the transducer L can be adjusted manually based upon the readings from meter 54 and detector 58 (FIG. 1) without having to stop the motion of the transducer. More preferably, however, the controls 68a and 68b are set automatically. That is, the signals from amplifier 48 and phase comparator 56 are processed in a computer shown in dotted lines at 78 in FIG. 5. The computer then determines the proper amplitude and phase settings for the voltage generator controls 68a and 68b, at which point, the vibrators 64 and 66 are energized to rotate transducer L to effect the compensation. Then the compensation determining circuit including the computer, can be deactivated. Of course the computer 78 could also be used to calculate the phase and sleeve 32 settings in the FIG. 1 arrangement.

The compensation technique disclosed here is relatively independent of the type of transducer used. For example, the transducer elements 36 and 38 can be disposed opposite a track on a disk 10 in the manner described in U.S. Pat. No. 3,840,893. In that event, the difference signal from the two transducers applied to amplifier 48 (FIG. 1) would operate in the same manner to effect the tracking and speed compensation.

The magnitude and phase angle of the track eccentricity relative to the rotation of disk 10 can also be detected by observing frequency variations in the output signal from the transducer. That is, if a fixed analog or digital signal is recorded on track T, its frequency is modulated by the frequency of rotation of disk 10. More specifically, it varies in accordance with the curve in FIG. 4b, being highest at point C and lowest at point A.

Also, the transducer L can be provided with a pair of inboard and outboard accessory transducers $L_1$ and $L_2$ as shown in dotted lines in FIG. 5. In this case, the output signals from these transducers are modulated in the manner illustrated by the curves in FIG. 4c and 4d. That is, as the track wanders outward from transducer L as at point C in FIG. 4, the outboard accessory transducer $L_2$ moves completely off the track so that its output is zero while the output of the inboard transducer $L_1$ is at a maximum because it is directly over the track. Conversely, when the track T wanders inboard of the transducer L as at point A, the outboard transducer $L_2$ is directly over the track so that its output is a maximum, while the output of the inboard transducer is zero. Therefore these signals can also be used to develop the error signal for amplifier 48 and comparator 56 (FIG. 1).

Actually to effect an exact compensation for track eccentricity in accordance with this technique, any two of the signals in FIG. 4 can be used. After proper compensation, m in FIG. 4a goes to zero as described above. Also the signal in FIG. 4b becomes a straight line and the signals in FIGS. 4c and 4d approach zero and become continuous rather than intermittent. Normally the transducer output signal FIG. 4a is always present and one of the others is used as available. Otherwise, a dual element transducer producing two signals like 4a in quadrature is used as described above in connection with FIG. 1.

Figure 6:
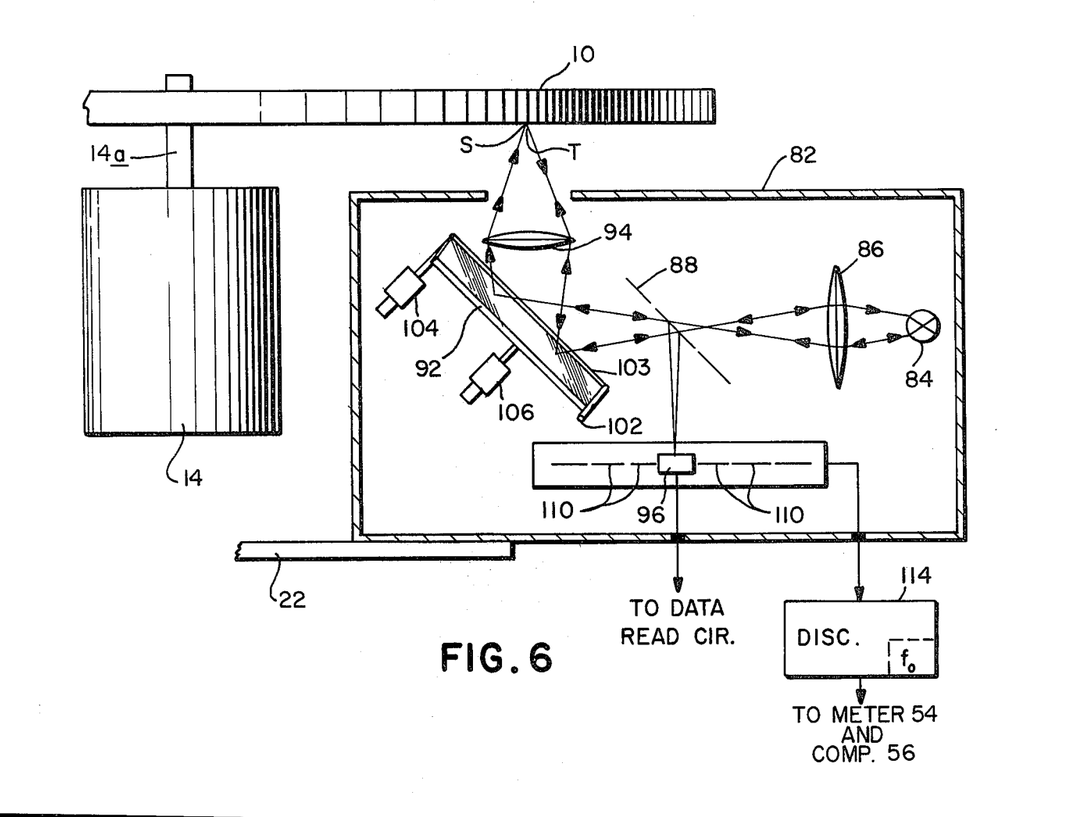
FIG. 6 is a diagrammatic view of still another embodiment of the invention.

FIG. 6 illustrates a system embodiment that is useful for compensating for eccentricity in an optical recording track on a video disk. In this case, the recording disk 10 has a "setup" track recorded with a single frequency near the rim of the disk. If there is track eccentricity, the frequency of the signal read from the disk varies in accordance with the curve in FIG. 4b.

In this arrangement, the information is read from disk 10 by a beam of radiation. The beam is produced, and the information contained therein after interaction with disk 10 is detected, by an optical system contained in a housing 82. Housing 82 is connected to the base member 22 and the entire housing can be moved in order to coarse position the beam spot opposite a selected track T on disk 10.

The optical system comprises a source of light 84. The light is collimated by a lens 86 along a path through a semi-silvered mirror 88 to a movable mirror 92. The light beam is reflected by mirror 92 through an imaging lens 94 to a spot S on disk 10. The beam of light, after being modulated by the information on disk 10 is reflected back to mirror 92 and thence to mirror 98 which images the modulated beam onto a detector 96 which develops a corresponding electrical signal that is applied to the data signal amplifier 60 (FIG. 1).

Compensation for an eccentric track T is achieved by tilting mirror 92. More particularly, mirror 92 is provided with hinges 102 and 103 on adjacent edges which are arranged relative to a support and to each other so that the mirror can be tilted about two mutually perpendicular axes. The axes are oriented so that when the mirror is tilted about hinge 102, the spot of light imaged onto disk 10 is shifted radially on the disk and when the mirror is tilted about axis 103, the spot of light is moved in a direction perpendicular to that radius.

A pair of vibrators 104 and 106 are provided at the edges of the mirror opposite hinges 102 and 103 respectively. The vibrator armatures are connected to the mirror so that they cock or tilt the mirror about its two hinges. In actual practice, it may be more convenient to arrange two separate mirrors in the light path and tilt each about a single hinge. In any event, these vibrators operate in the same way and perform the same function as the vibrators 64 and 66 in FIG. 5 in that they are driven in quadrature by signals from voltage generator 68 (FIG. 5). Therefore the phase and amplitude of the signal from voltage generator 68 are adjusted so that the mirror 92 is tilted about its two hinges 102 and 103 so that the light spot S imaged on disk 10 moves in a circle whose radius, angular velocity and phase coincide with those of the circle of eccentricity M (FIG. 3).

The tracking error is detected by a measuring detector 110 which may be a grating like the one described in U.S. Pat. No. 3,584,015. As described in that reference, there is received by detector 110 an image which corresponds to the track T pattern, and hence which also has the structure of a grating. By means of suitable pickup elements, the position of the grating-shaped image of the track pattern relative to the grating-shaped detector 110 produces a signal that is representative of the position of the scanning spot S on disk 10.

The output of the measuring detector 110 is applied to a discriminator 114. The peak deviation from $f_o$ of the signal from discriminator 114 compares to the amplitude signal from amplifier 48 in FIG. 1 and may be applied in the same way to meter 54 and comparator 56 to obtain an indication of the magnitude of the eccentricity of track T and its phase with respect to the rotation of disk 10. Also as described in connection with FIG. 5, this information can be processed in a computer and used to develop automatically the requisite amplitude and phase control signals for the voltage generator 68. Once these controls have been set properly, the generator output causes the vibrators 104 and 106 to tilt mirror 92 as required to make the scanning light spot S move in a circle corresponding to the circle of eccentricity. At that point, the FIG. 6 apparatus can be operated in its normal playback mode with the tracking error measuring system deactivated.

It will be seen from the foregoing, then, that using the above-described technique, the playback transducer in a recording machine can be moved in such a way as to exactly compensate for any eccentricity in the recording track during playback. Furthermore, the magnitude and phase angle of the eccentricity relative to the rotation of the recording member can be determined and the proper settings made in advance of playback that will move the transducer to compensate for the eccentricity. Therefore servo-following arrangements of the type used in prior comparable systems of this type are not required.

The present method and apparatus not only correct for radial tracking error due to eccentricity, but also compensate for any speed or time variation resulting from the eccentricity. Consequently, control signals or index points can be recorded along the tracks at more closely spaced locations and still be read out reliably by the playback machine. As a result, more information can be packed on a given area of the recording member than was possible heretofore.

Yet the above described compensation system requires only a few simple components so that its incorporation into a playback machine should not appreciably increase the overall cost of such machines.

It will thus be seen that the objects set forth above, among those made apparent from the preceding description, are efficiently attained. Also, it should be understood that certain changes may be made in carrying out the above method or the constructions set forth without departing from the scope of the invention. Therefore, it is intended that all matter contained in the above description or shown in the accompanying drawings shall be interpreted as illustrative and not in a limiting sense.

It is also to be understood that the following claims are intended to cover all of the generic and specific features of the invention herein described.

I claim:

1. The method of compensating for eccentricity in a circular or spiral recording track on a recording member rotating about an axis during playback comprising the steps of
   A. moving the playback transducer in a circular path opposite the track on the recording member,
   B. adjusting the radius of the circular path to equal the distance between the axis of rotation of the recording member and the center of the eccentric track, and
   C. controlling the movement of the transducer in phase to correspond to the phase angle of the instantaneous position of the track center about the axis of rotation of the recording member.

2. The method defined in claim 1 wherein the playback transducer is moved in its circular path by deflecting it simultaneously along the radius of rotation of the member and along a straight line perpendicular to said rotation radius.

3. The method of eliminating both amplitude and frequency or time variations in the output signal from a playback transducer as a result of reading from an eccentric track on a rotating recording member rotating about an axis during playback comprising the steps of
   A. determining the magnitude of eccentricity-causing amplitude or frequency modulation in the signal from a playback transducer reading from the track,
   B. determining the difference in phase between said modulation and the rotation of the recording member, and
   C. moving the playback transducer in a circle whose radius is proportional to said modulation magnitude and whose phase is equal to the phase of said modulation.

4. The method defined in claim 3 wherein the modulation magnitude is determined by measuring the difference between the frequency of the signal from the transducer and a fixed reference frequency.

5. The method defined in claim 3 wherein the phase difference is determined by measuring the difference in phase between the signal from the transducer and a second signal synchronized to the rotation of the recording member.

6. The method defined in claim 3 wherein the modulation magnitude is determined by producing a signal representing the difference between the signal levels read from the track at a pair of points along a straight line angled with respect to the track.

7. The method defined in claim 6 wherein the phase difference is determined by measuring the phase difference between the difference signal and a second signal synchronized to the rotation of the recording member.

8. The method of compensating for both tracking and speed errors when reading from a rotating recording member having an eccentric track whose center moves about the center of rotation along a circle of eccentricity comprising the steps of
   A. mounting the playback transducer for movement in the plane of the recording member, and
   B. moving the transducer in a circular path having the same radius, angular velocity and phase as the circle of eccentricity.

9. A system for compensating for eccentricity in a circular or spiral recording track on a rotating recording member comprising
   A. means for mounting the recording member about an axis,
   B. a playback transducer movably positioned opposite the recording track,
   C. means for moving the playback transducer in a circular path opposite the track in the plane of the recording member,
   D. means for adjusting the radius of the circular path to equal the distance between said axis of rotation of the recording member and the center of the eccentric track, and
   E. means for controlling the movement of the transducer in phase to correspond to the phase of the instantaneous position of the track center about said axis of rotation.

10. The system defined in claim 9 wherein the moving means comprises
    A. first deflecting means for deflecting the transducer in a direction along the radius of rotation of the recording member, and
    B. second deflecting means for simultaneously deflecting the transducer along a straight line perpendicular to said rotation radius.

11. A system for compensating for both the tracking and speed errors when reading from a rotating recording member having an eccentric track whose center moves about the center of rotation along a circle of eccentricity comprising A. means for rotating the recording member about an axis,
B. a playback transducer,
C. means for positioning the playback transducer opposite the recording member for movement in the plane of the recording member, and
D. means for moving the transducer in a circular path in said plane having the same radius, angular velocity and phase as the circle of eccentricity.

12. A system for compensating for eccentricity in the recording track on a rotatable recording member during playback comprising A. means for rotating the recording member about an axis,
B. a playback transducer,
C. means for mounting the playback transducer opposite the recording member for movement in the plane of the recording member,
D. means for determining the magnitude of eccentricity-causing amplitude or frequency modulation in the signal from the transducer as it reads from the track,
E. means for determining the difference in phase between said modulation and the rotation of the recording member,
F. means for moving the playback transducer in a circle in the plane of the recording member whose radius is proportional to said modulation magnitude, and
G. means for adjusting the phase of the moving means in accordance with said phase difference to be equal to the phase of said modulation.

13. The system defined in claim 12 wherein
A. the playback transducer includes a pair of read elements arranged in a line substantially perpendicular to said track for producing a pair of signals 180° out of phase,
B. said modulation magnitude determining means includes means for determining the amplitude or frequency difference between the signals from said read elements.

14. The system defined in claim 12 wherein said modulation magnitude determining means includes
A. means for producing a fixed reference frequency,
B. means for determining the difference in frequency between the signal from the transducer and said reference frequency to produce a difference signal, and
C. said moving means is controlled in accordance with the difference signal.

15. The system defined in claim 14 wherein
A. the phase difference determining means comprises (1) means for producing a second signal synchronized to the rotation of the recording member, and
(2) means for comparing the phases of said difference signal and said second signal to produce a phase error signal, and
B. said adjusting means is controlled in accordance with said error signal.

16. The system defined in claim 12 wherein the phase difference determining means comprises
A. means for producing a second signal synchronized to the rotation of the recording member, and
B. means for comparing the phase of said modulation and the phase of said second signal.

17. The system defined in claim 16 wherein the signal producing means includes a tachometer coupled to rotate with the recording member.

18. A system defined in claim 12 wherein
A. the mounting means includes an elongated, flexible member extending along a second axis, and
B. said moving means includes
(1) a weight,
(2) means for rotatively mounting the weight radially outward from said second axis and to move with said transducer,
(3) means for rotating the weight about said second axis, and
(4) means for adjusting the phase of the weight rotating means so that said weight rotates in phase with said modulation whereby said member flexes from said second axis to move the transducer in said circle.

19. A system defined in claim 12 wherein
A. said mounting means comprises an elongated flexible member extending along an axis, and
B. said moving means includes
(1) first deflection means for flexing the member from its axis in a direction parallel to the radius of rotation of the recording member,
(2) second deflection means for flexing the member from its axis along a straight line perpendicular to said rotation radius,
C. means for driving the deflection means in quadrature so that the member flexes along a circular path, and
D. means for controlling the drive means in phase to equal the phase of said modulation, and
E. means for controlling the drive means in amplitude so that the radius of said circular path is proportional to the magnitude of said modulation.

20. The system defined in claim 19 wherein
A. said deflecting means comprises a pair of vibrators,
B. said drive means includes a voltage generator providing an alternating signal to said vibrators, and
C. said drive control means comprises means for separately controlling the amplitude and phase of the output from the voltage generator.

* * * * *

UNITED STATES PATENT OFFICE
CERTIFICATE OF CORRECTION

Patent No. 4,087,842                  Dated May 2, 1978

Inventor(s) William A. Manly

It is certified that error appears in the above-identified patent and that said Letters Patent are hereby corrected as shown below:

Col. 4, line 57:    change "E" to --$\varepsilon$--

Col. 5, line 40:    change "to" to --is--

Signed and Sealed this

Twenty-sixth Day of December 1978

[SEAL]

Attest:

RUTH C. MASON
*Attesting Officer*

DONALD W. BANNER
*Commissioner of Patents and Trademarks*